United States Patent [19]

Engl

[11] 4,384,454
[45] May 24, 1983

[54] THRUST NOZZLE FOR ROCKET ENGINE WITH ABLATING LINING

[75] Inventor: Ernst Engl, Munich, Fed. Rep. of Germany

[73] Assignee: Messerschmitt-Bölkow-Blohm, Fed. Rep. of Germany

[21] Appl. No.: 210,624

[22] Filed: Nov. 26, 1980

[30] Foreign Application Priority Data

Nov. 30, 1979 [DE] Fed. Rep. of Germany ....... 2948197

[51] Int. Cl.³ ............................ F02K 9/72; F02K 9/97
[52] U.S. Cl. .......................................... 60/245; 60/909; 60/251; 60/271; 239/265.15
[58] Field of Search ................. 60/271, 200 A, 242, 60/270 S, 245, 253, 251; 239/265.15, 265.17

[56] References Cited

U.S. PATENT DOCUMENTS

| | | | |
|---|---|---|---|
| 3,073,111 | 1/1963 | Hasbrouck | 239/265.15 |
| 3,250,070 | 5/1966 | Milewski et al. | 60/271 |
| 3,633,631 | 1/1972 | Hatch et al. | 60/271 |
| 3,776,466 | 12/1973 | Ray | 60/200 A |

Primary Examiner—Carlton R. Croyle
Assistant Examiner—Jeffrey A. Simenauer
Attorney, Agent, or Firm—McGlew and Tuttle

[57] ABSTRACT

A thrust nozzle for a reaction engine having a combustion chamber with a sustained flight discharge nozzle defined therein for the passage of thrust gases and a sustained flight thrust arrangement connected to the combustion chamber for supplying thrust gases through the combustion chamber, the thrust nozzle comprising a starting nozzle formed on an interior wall of the combustion chamber radially inwardly of the sustained flight discharge nozzle made of a plurality of layers of ablatable material which are ablated by the passing thrust gases to discharge vaporized or fragmentary parts of the layers of ablatable material.

4 Claims, 2 Drawing Figures

THRUST NOZZLE FOR ROCKET ENGINE WITH ABLATING LINING

FIELD AND BACKGROUND OF THE INVENTION

The present invention relates in general to rocket engines, and, in particular to a new and useful take-off thrust nozzle for reaction engines, particularly rocket ramjet engines, which have an ablating lining.

In ramjet engines for propelling missiles, so called booster nozzles are known, for example, from German AS No. 1,181,496, which are intended to temporarily reduce the air velocities in the combustion chamber during ignition of the main engine, so as to ensure a satisfactory ignition. Upon starting the ignition process in the combustion chamber, the booster nozzle is ejected as a whole or in parts or fragments. To this end the booster nozzle is made of a material having a sufficiently low fusion point, and the structure of the nozzle is sectioned into individually larger areas by perforation rows. Upon ignition in the combustion chamber, the heat first fuses the webs between the individual perforations so that the booster nozzle is disintegrated into individual fragmentary parts which are expelled rearwardly.

It is further known in rockets and ramjet engines for propelling missiles, to fill the common combustion chamber, which is used for both starting and sustaining the flight, with a solid start fuel for the starting period and to design the following discharge nozzle as a combined sustainer nozzle having a throat structure which is formed by an inside lining of graphite, glass-reinforced plastic, or the like, and serves as the start nozzle. At the end of the starting period, this start nozzle is separated and expelled rearwardly as a whole or in broken parts. Where such missiles are launched from a carrier or launching aircraft the fragments thus produced are very hazardous for the carrier aircraft or other following aircraft.

SUMMARY OF THE INVENTION

The present invention is directed to a design which eliminates this hazard with an absolute certainty, while providing a start nozzle structure still having a geometry ensuring a satisfactory efficiency during the entire starting period.

Accordingly, an object of the present invention is to provide a thrust nozzle for a reaction engine having means defining a combustion chamber with a sustained flight discharge nozzle for the passing of thrust gases and sustained flight thrust means connected to the means defining the combustion chamber for supplying thrust gases through the combustion chamber, the thrust nozzle comprising a starting nozzle formed radially inwardly of the sustained thrust discharge nozzle on an interior wall of the thrust chamber which is made of a plurality of layers of ablatable material which is ablated by passing thrust gases.

A further object of the invention is to provide such a thrust nozzle which includes a startup thrust gas fuel body in the combustion chamber which produces the thrust gases which ablate the starting nozzle.

A further object of the present invention is to provide such a thrust nozzle wherein the layers of ablatable material are made of graphite, plastic or metal foil which are connected to each other by intermediate layers of heat destructible material.

A still further object of the invention is to provide such a nozzle wherein the heat destructible material connecting the plurality of ablatable layers is silicon resin or a fuel material which burns to produce additional thrust gas during the starting period such as polybutadiene, polyurethanes and the like.

Another object of the present invention is to provide such a thrust nozzle wherein the starting nozzle is made up of a supporting core body of rapidly heat destroyable material such as solid foam over which the ablatable layers and intermediate layers are connected with the cross-sectional shape of the supporting core body being chosen to conform to operating conditions at the end of a take-off period.

Due to the inventive design of the start nozzle, only minute particles are ejected rearwardly as the nozzle is ablated during the starting period, since the ablation layers and the supporting core substantially instantly vaporize under the produced heat. Since the ablation layers are made of suitable materials having a thermal and mechanical resistance such that they withstand these loads consecutively or sequentially up to shortly before the complete burning down of the starting charge, the throat-shaped supporting core preserves a nozzle configuration satisfying the prevailing operational conditions during the entire duration of the starting period. If an internally burning grain is used for the starting period, the continuously enlarging effective cross-sectional area of the start nozzle is compensated for by an increasing amount of produced gases, since, with such a shape of the fuel body, the burning surface also continuously enlarges.

A further object of the invention is to provide a thrust nozzle which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 2:
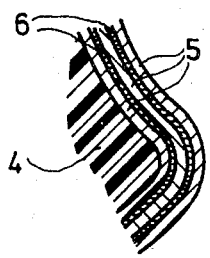
FIG. 2 is an enlarged detailed view of a circled portion of the starting nozzle shown in FIG. 1, according to the invention.
Figure 1:
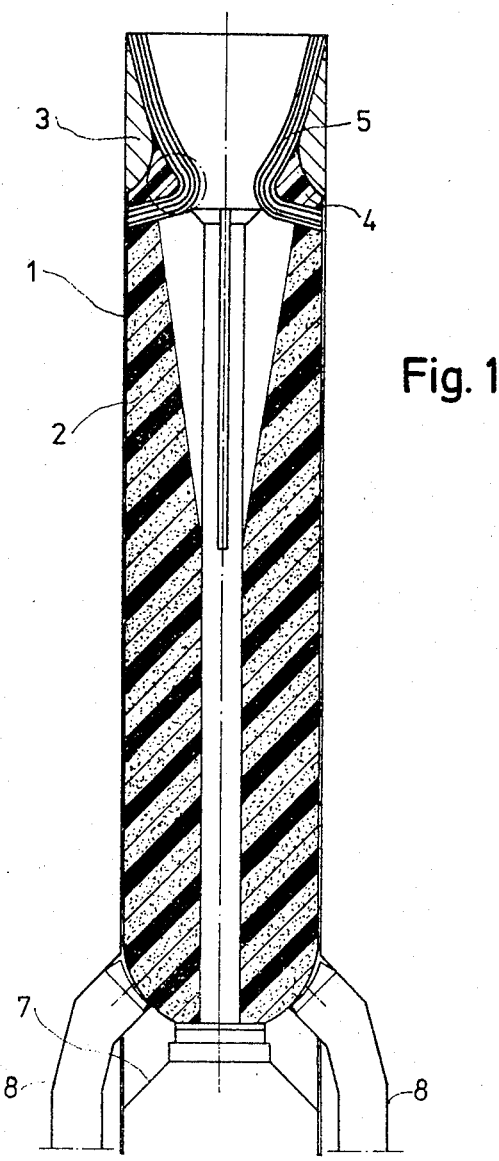
FIG. 1 is a longitudinal sectional view of a combustion chamber with discharge nozzle connected to parts of a rocket ramjet structure according to the invention.

Turning to the drawings in particular, the invention embodied therein, comprises a solid fuel body or charge which is received as the starting charge within a combustion chamber 1. Fuel body 2 is formed with internal burning grain or configuration. At the end of combustion chamber 1, a combined thrust nozzle is attached whose basic structure forms the sustainer nozzle 3. Basic nozzle 3 is lined with a start nozzle which is built up of a supporting core 4 and a plurality of applied layers, which are so called ablation layers 5, as may be seen in the drawings. The materials used for layers 5 are in particular, graphite, plastics or metal foils which are firmly connected to each other by intermediate layers 6 of a material destructible by heat, such as silicone resins, but particularly of fuel materials which burn down themselves during the starting period, such as polybutadiene or polyurethanes as seen in detail, in FIG. 2.

To start the engine, starting charge 2 is ignited. The propelling gases thereby produced flow through start nozzle 4,5 toward the outside, while producing thrust, and, under the effect of the heat, layers 5 are ablated one after the other and either vaporize or are ejected rearwardly as minute fragments. The material of layers 5 is so selected or the layers are provided in such a number that at the end of the starting period, or shortly before the starting charge 2 is completely burned down, the last (radially outermost) layer is ablated. Since layers 5 are applied to a throat-shaped supporting core 4, the relatively narrow shape of the throat, required for the take-off and acceleration operations, is preserved up to the end of the combustion process, and in the end phase of the starting operation, supporting core 4 is also ablated, more particularly burns down if a combustible or thermally easily destructible material, such as solid foam, is used.

A solid fuel charge is received in a container 7 which is ignited as soon as starting charge 2 burns down, and, during the sustaining period, produces fuel-rich gases which react in combustion chamber 1 with the oxygen of the air flowing into combustion chamber 1 through ducts 8. Container 7 and and ducts 8 form part of sustained flight thrust means connected to the common combustion chamber 1.

While a specific embodiment of the invention has been shown and described in detail to illustrate the application of the principles of the invention, it will be understood that the invention may be embodied otherwise without departing from such principles.

What is claimed is:

1. In a take-off thrust nozzle for a reaction engine, particularly a rocket ram jet engine, comprising a combustion chamber which is common for use during a starting phase and a sustaining phase, and a following throat having a basic structure which serves as a sustainer nozzle and a radially inner portion which includes a plurality of superimposed ablation layers and serves as a start nozzle which is intended to be destroyed by heat during the starting phase, the improvement comprising, the ablation layers having intermediate layers therebetween, the radially inner portion including a supporting core having a throat contour corresponding to a required cross sectional shape to satisfy operating conditions during a temporary starting phase, said supporting core being made of material which is destroyed very quickly by heat at an end of the starting phase after the ablation of the ablation layers, the ablation layers and intermediate layers positioned over said supporting core and covering said supporting core during most of the starting phase.

2. In a take-off thrust nozzle according to claim 1, the improvement including the ablation layers made of a material chosen from the group consisting of graphite, plastic and metal foil.

3. In a take-off thrust nozzle according to claim 2, the improvement wherein said intermediate layers are made of material chosen from the group consisting of silicon resin, polybutadiene, and polyurethane.

4. In a take-off thrust nozzle according to claim 1, the improvement wherein said supporting core is made of rigid foam material.

* * * * *